(12) United States Patent
Nishioka et al.

(10) Patent No.: US 12,072,985 B2
(45) Date of Patent: Aug. 27, 2024

(54) POLICY EVALUATION APPARATUS, CONTROL METHOD, AND PROGRAM

(71) Applicant: NEC Corporation, Tokyo (JP)

(72) Inventors: Jun Nishioka, Tokyo (JP); Yoshiaki Sakae, Tokyo (JP); Kazuhiko Isoyama, Tokyo (JP); Takashi Konashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 254 days.

(21) Appl. No.: 17/632,361

(22) PCT Filed: Aug. 7, 2019

(86) PCT No.: PCT/JP2019/031119
§ 371 (c)(1),
(2) Date: Feb. 2, 2022

(87) PCT Pub. No.: WO2021/024415
PCT Pub. Date: Feb. 11, 2021

(65) Prior Publication Data
US 2022/0284107 A1    Sep. 8, 2022

(51) Int. Cl.
*G06F 21/57* (2013.01)
*G06F 21/31* (2013.01)
*G06F 21/78* (2013.01)

(52) U.S. Cl.
CPC ............ *G06F 21/577* (2013.01); *G06F 21/31* (2013.01); *G06F 21/78* (2013.01)

(58) Field of Classification Search
CPC . H04L 9/32; G06F 21/52; G06F 21/53; G06F 21/54; G06F 21/44; G06F 21/00; G06F 21/50; G06F 21/51
See application file for complete search history.

(56) References Cited

U.S. PATENT DOCUMENTS

| | | | | |
|---|---|---|---|---|
| 6,327,618 B1 * | 12/2001 | Ahlstrom | ............ | H04L 41/0893 707/999.005 |
| 8,286,219 B2 * | 10/2012 | Khalid | .................... | G06F 21/56 726/1 |
| 10,909,236 B2 * | 2/2021 | Mehta | .................... | G06F 21/54 |

(Continued)

FOREIGN PATENT DOCUMENTS

| | | | |
|---|---|---|---|
| JP | 2003-233521 A | 8/2003 | |
| JP | 2004-355450 A | 12/2004 | |

(Continued)

OTHER PUBLICATIONS

International Search Report for PCT Application No. PCT/JP2019/031119, mailed on Oct. 29, 2019.

(Continued)

*Primary Examiner* — Olugbenga O Idowu

(57) ABSTRACT

A policy evaluation apparatus (2000) acquires, with respect to each of a plurality of control groups (10) including an evaluation target group, control policies (20). Each of the control policy (20) indicates execution permission/non-permission of an application. Further, the policy evaluation apparatus (2000) compares an evaluation target policy being the control policy (20) of the evaluation target group with other plurality of control policies (20), and generates evaluation information (30) based on the comparison result.

21 Claims, 10 Drawing Sheets

(56) References Cited

U.S. PATENT DOCUMENTS

2008/0184200 A1* 7/2008 Burns ................ G06F 9/44505
717/121
2018/0184200 A1 6/2018 Rocca

FOREIGN PATENT DOCUMENTS

| | | |
|---|---|---|
| JP | 2006-043298 A | 2/2006 |
| JP | 2006-079353 A | 3/2006 |
| JP | 2006-139598 A | 6/2006 |
| JP | 2018-041266 A | 3/2018 |

OTHER PUBLICATIONS

Sumitaka Okajo et al., "A policy description language for policy-based security anagement", IPSJ SIG Technical Reports, Dec. 20, 2004, vol. 2004, No. 129, pp. 89-94.
JP Office Action for JP Application No. 2021-538619, mailed on Mar. 22, 2023 with English Translation.

* cited by examiner

FIG. 7

| CONTROL CONDITION | PERMISSION/NON-PERMISSION FLAG | REASON |
|---|---|---|
| HASH VALUE : 823473ab1231 | 0 (NON-PERMISSION) | KNOWN MALWARE |
| SIGNATURE : ab123133333 | 1 (PERMISSION) | RELIABILITY OF ISSUE SOURCE OF SIGNATURE IS HIGH |
| . . . | . . . | . . . |

FIG. 8

EVALUATION RESULT

EVALUATED GROUP: B DIVISION, A COMPANY
COMPARISON TARGET GROUP: ALL
EVALUATED DATE AND TIME: JUNE 1, 2019

| CONTROL CONDITION | REASON | DETAIL DISPLAY |
|---|---|---|
| HASH VALUE : 823473ab1231 | SETTING IS DIFFERENT FROM MAJORITY | DETAILS |
| APPLICATION NAME : xyz | SETTING IS MADE IN MANY GROUPS, BUT SETTING IS NOT MADE IN EVALUATION TARGET | DETAILS |
| ... | ... | ... |
| ... | ... | ... |
| ... | ... | ... |

POLICY EVALUATION APPARATUS, CONTROL METHOD, AND PROGRAM

This application is a National Stage Entry of PCT/JP2019/031119 filed on Aug. 7, 2019, the contents of all of which are incorporated herein by reference, in their entirety.

TECHNICAL FIELD

The present invention relates to a policy for controlling execution of an application.

BACKGROUND ART

A technique for monitoring, in accordance with a security policy, execution of an application has been developed. Patent Document 1, for example, discloses a technique for monitoring whether a security policy is observed in each computer and modifying, based on the monitoring result, the security policy.

RELATED DOCUMENT

Patent Document

[Patent Document 1] Japanese Patent Application Publication No. 2018-041266

SUMMARY OF THE INVENTION

Technical Problem

The present inventor has found that, with respect to a policy for controlling execution of an application, it is important to verify adequacy of the policy. In this point, it is also difficult for the technique according to Patent Document 1 to verify adequacy of a security policy. Further, the technique according to Patent Document 1 is assumed to monitor execution of an application but is not assumed to control execution of an application.

In view of the problem described above, the present invention has been made, and one object of the present invention is to provide a technique for easing, with respect to a policy for controlling execution of an application, verification for adequacy of the policy.

Solution to Problem

A policy evaluation apparatus according to the present invention includes: 1) an acquisition unit that acquires, with respect to each of a plurality of control groups including an evaluation target group, control policies each indicating execution permission/non-permission of an application to be executed on a terminal included in the control group; and 2) an evaluation unit that compares an evaluation target policy being the control policy of the evaluation target group with other plurality of control policies and generates evaluation information based on the comparison result.

A control method according to the present invention is executed by a computer. The control method includes: 1) an acquisition step of acquiring, with respect to each of a plurality of control groups including an evaluation target group, control policies each indicating execution permission/non-permission of an application to be executed on a terminal included in the control group; and 2) an evaluation step of comparing an evaluation target policy being the control policy of the evaluation target group with other plurality of control policies and generating evaluation information based on the comparison result A program according to the present invention causes a computer to execute each step of the control method according to the present invention.

Advantageous Effects of Invention

According to the present invention, a technique for easing, with respect to a policy for controlling execution of an application, verification for adequacy of the policy is provided.

BRIEF DESCRIPTION OF THE DRAWINGS

The above-described object, other objects, features, and advantages will become more apparent from a preferred example embodiment described below and the following accompanying drawings.

FIG. 7 is a diagram illustrating, based on a table format, a configuration of a control policy.

FIG. 8 is a diagram illustrating evaluation information.

DESCRIPTION OF EMBODIMENTS

Hereinafter, an example embodiment according to the present invention is described by using the accompanying drawings. Note that, in all drawings, a similar component is assigned with a similar reference sign and description thereof may be omitted, as appropriate. Further, in each block diagram, unless otherwise specifically described, each block does not represent a configuration based on a hardware unit but represents a configuration based on a function unit <Outline>

Figure 1:
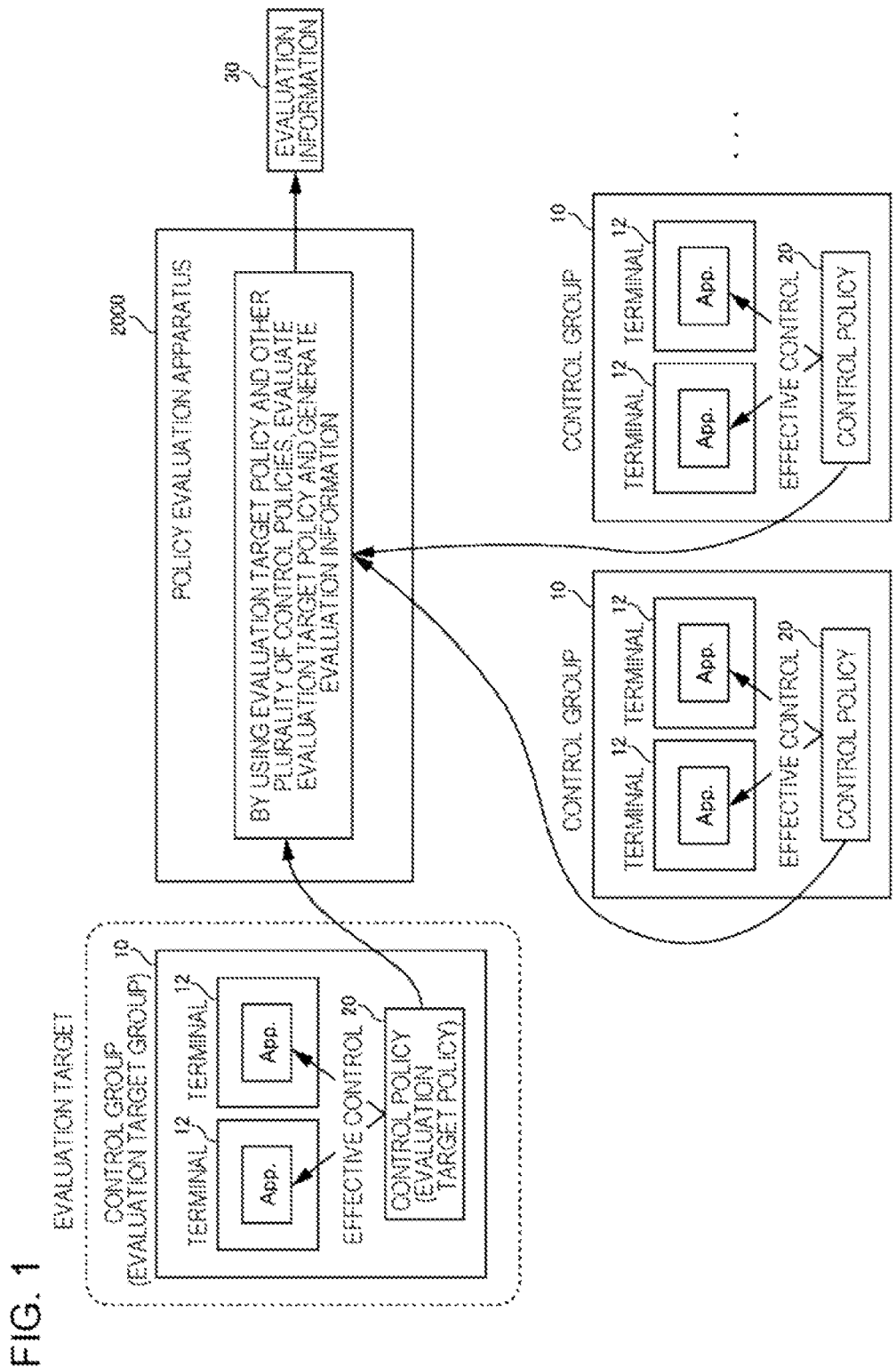
FIG. 1 is a diagram illustrating an outline of an operation of a policy evaluation apparatus according to a present example embodiment.

FIG. 1 is a diagram illustrating an outline of an operation of a policy evaluation apparatus 2000 according to the present example embodiment. FIG. 1 is a diagram illustrating a conceptual explanation for easing understanding of the operation of the policy evaluation apparatus 2000 and does not specifically limit the operation of the policy evaluation apparatus 2000.

The policy evaluation apparatus 2000 executes, with respect to a control policy 20 being used in a certain control group 10, evaluation based on a control policy 20 being used in each of a plurality of control groups 10. Then, the policy evaluation apparatus 2000 outputs evaluation information 30 representing the evaluation result. Hereinafter, a control policy 20 to be evaluated is referred to as an evaluation target policy, and a control group 10 in which an evaluation target policy is being used is referred to as an evaluation target group.

The control group 10 includes one or more terminals 12. In the terminal 12 included in the same control group 10, execution of an application operating on the terminal 12 is controlled by a common control policy 20. Herein, the terminal 12 may be a physical machine or may be a virtual machine.

Execution permission/non-permission of an application in the terminal 12 is determined based on the control policy 20. Determination based on the control policy 20 may be executed in the terminal 12 or may be executed outside the terminal 12. In the latter case, for example, a server (a group server 40 or the like to be described later) that receives, from the terminal 12, an inquiry about whether an application is executable is provided in the control group 10, and the server executes determination in response to an inquiry.

The control policy 20 includes a plurality of entries indicating execution permission/non-permission of an application. An entry of the control policy 20 is, for example, information in which a condition (hereinafter, referred to as a control condition) for determining an application to be controlled is associated with execution permission/non-permission (a flag or the like indicating whether execution is permitted) of an application satisfying the control condition. The control condition indicates, for example, a condition for identification information (an execution path or the like), an attribute, or introduction of an application. A condition for introduction of an application is a condition for an introduction route and the like of an application. Details thereof are described later.

For an evaluation result indicated by evaluation information 30, various items are employable. The evaluation information 30 indicates, for example, an entry of an evaluation target policy having a large deviation from statistics acquired from another control policy 20.

<One Example of Advantageous Effects>

As one method in which an administrator of a policy for execution permission/non-permission of an application verifies adequacy of the policy, a method of executing comparison with a similar policy being used in another group is conceivable. It is assumed that, for example, while a policy in a group A indicates that execution of an application X is permitted, a policy in many other groups indicates that execution of the application X is not permitted. In this case, it is conceivable that an administrator of a policy in the group A needs to confirm adequacy of setting of a policy for the application X. In this manner, when, with respect to a policy to be managed, setting having a large deviation from statistics acquired from another policy or the like can be easily recognized, it is easy for an administrator of a policy to verify adequacy of a content of the policy.

Therefore, the policy evaluation apparatus 200 according to the present example embodiment executes, with respect to the control policy 20 being a policy for controlling execution of an application, evaluation based on comparison with another plurality of control policies 20. When a result of such evaluation based on comparison with another control policy 20 is used, an administrator of a policy can easily verify adequacy of a content of the policy.

Hereinafter, the policy evaluation apparatus 2000 according to the present example embodiment is described in more detail.

<An Example of a Function Configuration of a Policy Evaluation Apparatus 2000>

Figure 2:
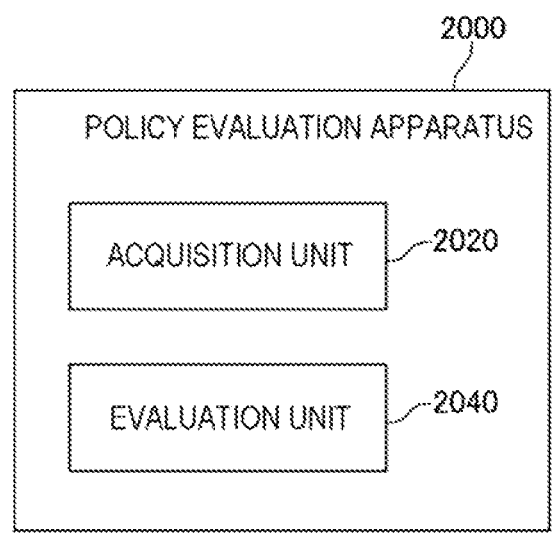
FIG. 2 is a diagram illustrating a configuration of a policy evaluation apparatus according to a first example embodiment.

FIG. 2 is a diagram illustrating a configuration of a policy evaluation apparatus 2000 according to a first example embodiment. The policy evaluation apparatus 2000 includes an acquisition unit 2020 and an evaluation unit 2040. The acquisition unit 2020 acquires the control policy 20 for each of a plurality of control groups 10 including an evaluation target group. The evaluation unit 2040 evaluates, based on the plurality of acquired control policies 20, an evaluation target policy and generates evaluation information 30 representing the evaluation result.

<A Hardware Configuration of the Policy Evaluation Apparatus 2000>

Each function configuration unit of the policy evaluation apparatus 2000 may be achieved by hardware (e.g., a hard-wired electronic circuit, and the like) achieving each function configuration unit, or may be achieved by a combination of hardware and software (e.g., a combination of an electronic circuit and a program for controlling the circuit, and the like). Hereinafter, a case where each function configuration unit of the policy evaluation apparatus 2000 is achieved by a combination of hardware and software is further described.

Figure 3:
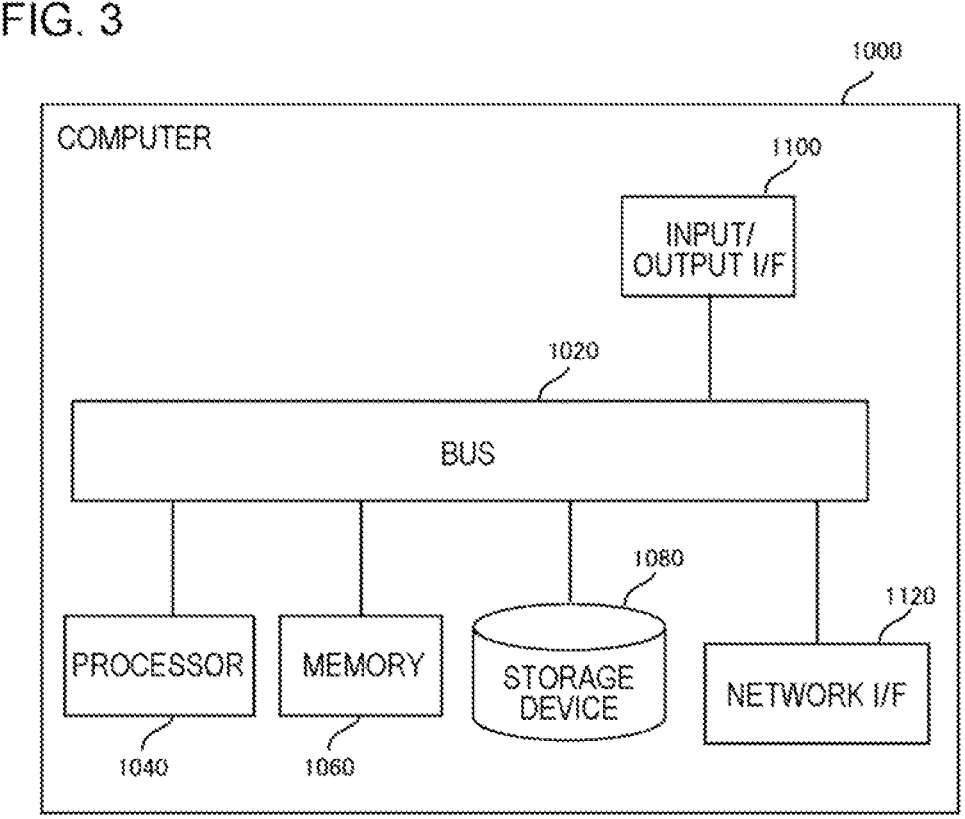
FIG. 3 is a diagram illustrating a computer for achieving the policy evaluation apparatus.

The policy evaluation apparatus 2000 is achieved, for example, by one computer. FIG. 3 is a diagram illustrating a computer 1000 for achieving the policy evaluation apparatus 2000. The computer 1000 is any computer. The computer 1000 is, for example, a personal computer (PC), a server machine, a tablet terminal, or a smartphone. The computer 1000 may be a dedicated computer designed in order to achieve the policy evaluation apparatus 2000, or may be a general-purpose computer.

The computer 1000 includes a bus 1020, a processor 1040, a memory 1060, a storage device 1080, an input/output interface 1100, and a network interface 1120. The bus 1020 is a data transmission path in which the processor 1040, the memory 1060, the storage device 1080, the input/output interface 1100, and the network interface 1120 mutually transmit/receive data with one another. However, a method of mutually connecting the processor 1040 and the like is not limited to bus connection. The processor 1040 is a processor such as a central processing unit (CPU), a graphics processing unit (GPU), a field-programmable gate array (FPGA). The memory 1060 is a main storage apparatus achieved by using a random access memory (RAM) and the like. The storage device 1080 is an auxiliary storage achieved by using a hard disk drive, a solid state drive (SSD), a memory card, a read only memory (ROM), or the like. However, the storage device 1080 may be configured by using hardware similar to hardware configuring the main storage such as a RAM.

The input/output interface 1100 is an interface for connecting the computer 1000 and an input/output device. The network interface 1120 is an interface for connecting the computer 1000 to a communication network. The communication network is, for example, a local area network (LAN) or a wide area network (WAN). A method for connection to a communication network based on the network interface 1120 may be wireless connection or may be wired connection.

The storage device 1080 stores a program module for achieving function-configuring units of the policy evaluation apparatus 2000. The processor 1040 reads each of the program modules onto the memory 1060 and executes the read program module, and thereby achieves a function relevant to each of the program modules.

The policy evaluation apparatus 2000 may be achieved by two or more computers. Each computer in this case also includes, for example, a hardware configuration illustrated in FIG. 3.

<A Flow of Processing>

Figure 4:
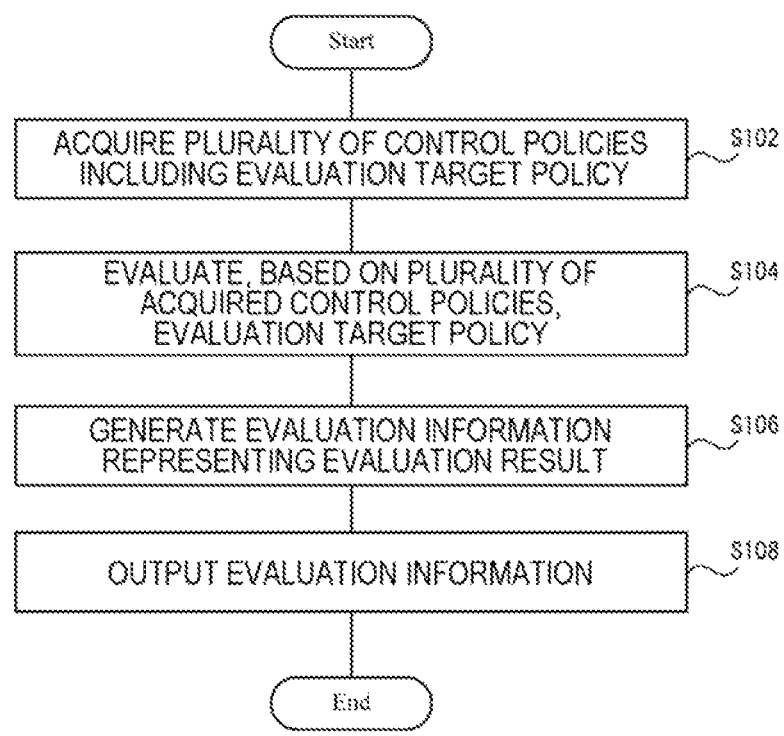
FIG. 4 is a flowchart illustrating a flow of processing executed by the policy evaluation apparatus according to the first example embodiment.

FIG. 4 is a flowchart illustrating a flow of processing executed by the policy evaluation apparatus 2000 according to the first example embodiment. The acquisition unit 2020 acquires the control policy 20 for each of a plurality of control groups 10 (S102). The evaluation unit 2040 evaluates, based on the plurality of acquired control policies 20, an evaluation target policy (S104). The evaluation unit 2040 generates evaluation information 30 representing an evaluation result (S106). The evaluation unit 2040 outputs the evaluation information 30 (S108).

<Examples of Usage Patterns of the Policy Evaluation Apparatus 2000>

For a usage pattern of the policy evaluation apparatus 2000, various usage patterns are employable. Hereinafter, a couple of usage patterns of the policy evaluation apparatus 2000 are exemplarily described.

<<Usage Pattern 1>>

Figure 5:
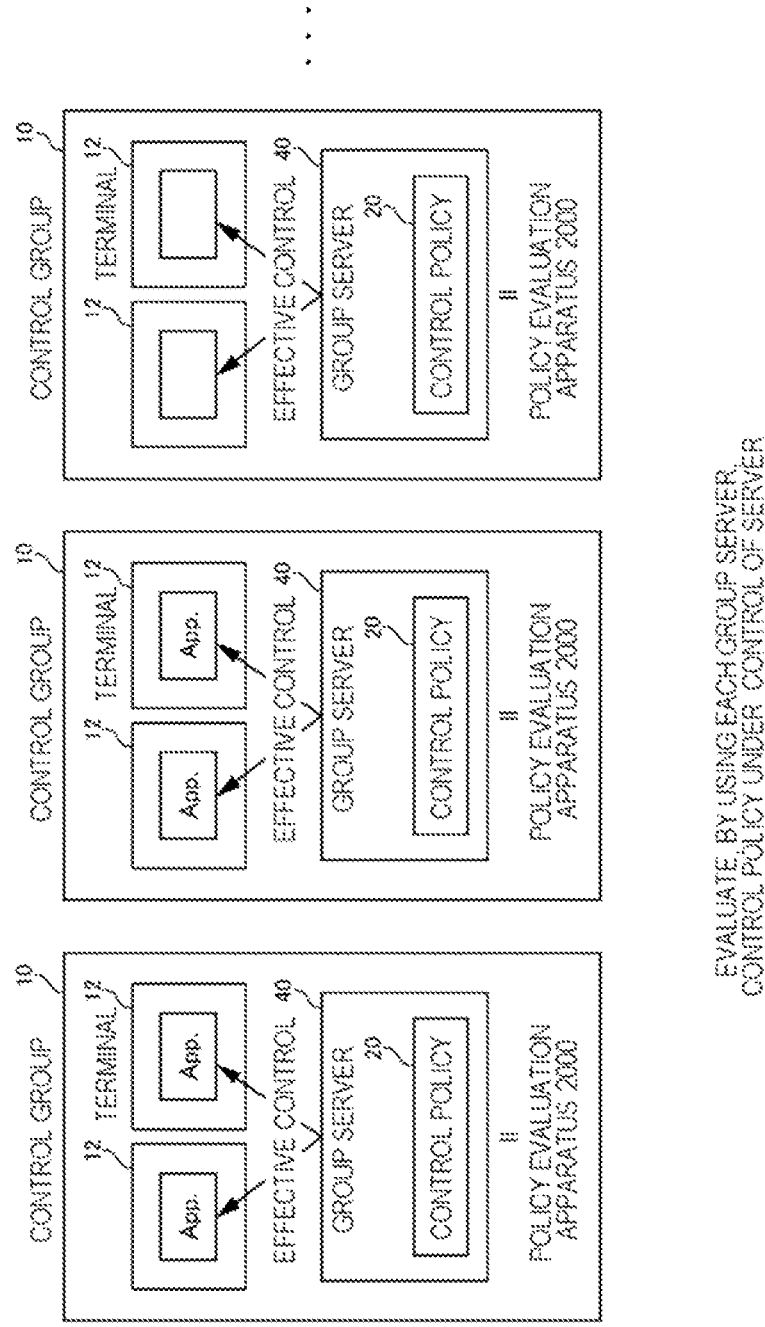
FIG. 5 is a first diagram illustrating a usage pattern of the policy evaluation apparatus.

FIG. 5 is a first diagram illustrating a usage pattern of the policy evaluation apparatus 2000. In FIG. 5, in each control group 10, the group server 40 is included. The group server 40 evaluates the control policy 20 by using, as an evaluation target, the control policy 20 used in the control group 10 including the group server 40. In other words, in this usage pattern, with respect to each control group 10, the group server 40 functioning as the policy evaluation apparatus 2000 that evaluates the control policy 20 used in the control group 10 is provided. Further, in the example in FIG. 5, the group server 40 also functions as a server that controls, based on the control policy 20, execution of an application in each terminal 12. However, an apparatus that evaluates the control policy 20 and an apparatus that controls execution of an application may be achieved as apparatuses different from each other.

<<Usage Pattern 2>>

Figure 6:
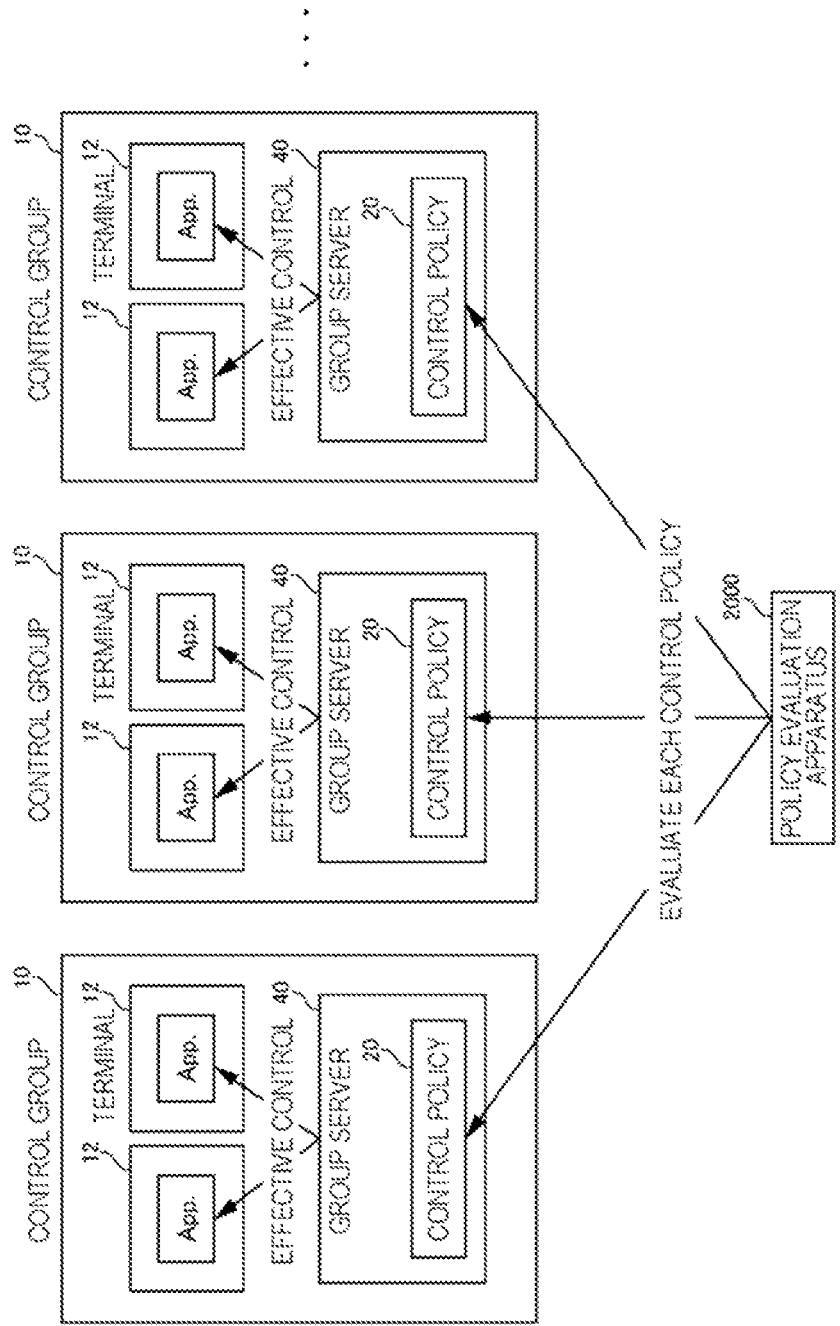
FIG. 6 is a second diagram illustrating a usage pattern of the policy evaluation apparatus.

FIG. 6 is a second diagram illustrating a usage pattern of the policy evaluation apparatus 2000. In FIG. 6, outside the control group 10, the policy evaluation apparatus 2000 is provided. Therefore, the policy evaluation apparatus 2000 evaluates the control policy 20 used in each of one or more control groups 10.

For example, the group server 40 that controls execution of an application in the control group 10 transmits, to the policy evaluation apparatus 2000, a request for an evaluation request of the control policy 20 used by the own server. Transmission of a request may be automatically executed by the group server 40 or, may be manually executed by a user (an IT administrator or the like) of the group server 40. In the former case, the group server 40 transmits, for example, a request at a periodical timing. The policy evaluation apparatus 2000 executes, in response to reception of the request, evaluation by using, as an evaluation target, the control policy 20 managed by the group server 40 having transmitted the request. In addition, the policy evaluation apparatus 2000 may evaluate, for example, each of all control policies 20 at a periodical timing. In this case, each of all control policies 20 is handled as an evaluation target.

<Regarding the Control Policy 20>

The control policy 20 will be exemplarily described. The control policy 20 indicates a criterion for controlling execution of an application. The control policy 20 includes, for example, a control condition and one or more entries that associate the control condition with execution permission/non-permission of an application. As described above, the control condition is, for example, a condition for identification information, an attribute, or introduction of an application.

A condition for identification information of an application indicates, for example, identification information itself of an application, i.e., information uniquely determining an application. As identification information of an application, for example, a name of an application, a name of an executable file of an application, a path of the executable application, or the like is usable. In addition, as a condition for identification information of an application, for example, a directory to which an executable file of an application belongs is usable. In this case, execution permission/non-permission of one or more applications located under a directory indicated in a control condition can be represented by one entry. In addition, as a condition for identification information of an application, for example, a generic term of one or more applications may be indicated.

As a condition for an attribute of an application, for example, a certificate itself attached to an executable file of an application, a condition (e.g., a preparer of a certificate) for the certificate, and the like are usable. In addition, as a condition for an attribute of an application, for example, a hash value of binary of an executable file of an application is usable.

A condition for introduction of an application can be represented, for example, by any piece of information described below or a combination of these pieces of information. Hereinafter, these are collectively referred to as introduction-related information.

1) Route information: information relating to an introduction route of an application
2) Deployment information: information relating to a location where an application is deployed
3) Setting information: information relating to setting associated with introduction of an application Route information includes information relating to software, hardware, a service, and the like related to introduction of an application. Software related to introduction of an application is, for example, a downloader used for downloading an application and an installer used for installing an application. Further, when an installer or the like of an application is acquired as a compressed file, decompression software used for decompressing the compressed file can be also referred to as software related to introduction of an application. Hardware related to introduction of an application is, for example, a storage apparatus and the like storing an installer and an executable file of an application. A service related to introduction of an application includes, for example, a web site providing an installer and the like of an application, a proxy disposed between a providing source of an application and a machine into which the application is introduced, and the like.

It is assumed that, for example, a file F being a compressed file of an installer I of an application X is provided by a server S. Then, it is assumed that the file F is downloaded from the server S by using a downloader D, the file F is decompressed by decompression software B, the installer I of the application X acquired by the decompression is executed, and thereby the application X is introduced into a machine. In this case, for example, route information of the application X indicates information including "the server S, the downloader D, the decompression software B, and the installer I".

It is assumed that the route information including "the server S, the downloader D, the compression software B, and the installer I" described above is indicated as a control condition. In this case, an application satisfying a condition in that "the file F is downloaded from the server S by using the downloader D, the file F is decompressed by the decompression software B, the installer I of the application X acquired by the decompression is executed, and thereby the application X is introduced into the machine" is an application satisfying the control condition.

Disposition information indicates information relating to a location (a directory or the like) where a file (an executable file, a setting file, and the like) related to an application is written, and the like.

Setting information is information representing, with respect to a registry and an existing setting file added with a modification in association with introduction of an application, a modification of the setting.

FIG. 7 is a diagram illustrating, based on a table format, a configuration of the control policy 20. The control policy 20 in FIG. 6 is referred to as a table 200. The table 200 includes a control condition 202, a permission/non-permission flag 204, and a reason 206. The control condition 202 indicates the above-described control condition. The permission/non-permission flag 204 indicates execution permission/non-permission of an application. The permission/non-permission flag 204, for example, represents execution permission when a value is 1 and represents execution non-permission when a value is 0. The reason 206 represents a reason for permitting execution of an application or a reason for not permitting an application.

<Regarding Control Using the Control Policy 20>

A method of controlling, by using the control policy 20, whether an application is executable is described. The control policy 20 is used for determining execution permission/non-permission of an application in the terminal 12. When, for example, activation of an application is detected in the terminal 12, the activation is temporarily interrupted, and it is determined whether the application is executable, by using the control policy 20 used in the control group 10 to which the terminal 12 belongs. When execution of the application is permitted, activation of the application is restarted. On the other hand, when execution of the application is not permitted, based on a method of terminating activation of the application or the like, the application is forced not to be executed. Note that, as a technique for detecting activation of an application, temporarily interrupting the activation, and causing another piece of processing to intervene, an existing technique is usable.

An apparatus that executes execution control using the control policy 20 is referred to as an execution control apparatus. The execution control apparatus may be achieved as the terminal 12, or may be achieved as a server that receives a request from the terminal 12.

The execution control apparatus acquires, when activation of an application is started in the terminal 12, information relating to the application being activated, compares the information of the application with each entry of the control policy 20, and thereby determines an entry in which a control condition is satisfied by the application being activated. Then, the execution control apparatus determines execution permission/non-permission of the application, based on execution permission/non-permission (the above-described permission/no-permission flag 204) of an application indicated by the determined entry. Herein, as a technique for acquiring information relating to identification information and an attribute of an application, an existing technique is usable.

Introduction-related information of an application is generated during introduction of the application and is stored in a storage apparatus accessible from the terminal 12 or an execution control apparatus. For example, agent software that monitors an operation of a process is previously introduced into the terminal 12. The agent software stores, for example, a history of an event (e.g., execution of a system call) generated by a process. A history of an event is represented, for example, by a combination of a subject, an object, and a content of an event. Introduction-related information of an application can be generated by analyzing/storing of a sequence of events being occurred during introduction of an application.

It is determined, by a degree of similarity between introduction-related information of an application being activated and introduction-related information indicated as a control condition by the control policy 20, whether introduction-related information of the application being activated satisfies a control condition indicated by the control policy 20. Specifically, when the degree of similarity is equal to or more than a threshold, it is determined that a control condition is satisfied.

Herein, a degree of similarity of introduction-related information can be computed as a degree of similarity of a graph representing an introduction route. As a technique for computing a degree of similarity of a graph, an existing technique is usable.

<Acquisition of the Control Policy 20: S102>

The acquisition unit 2020 acquires a plurality of control policies 20 including an evaluation target policy (S102). Hereinafter, acquisition of an evaluation target policy and acquisition of the control policy 20 other than the evaluation target policy are separately described.

<<Acquisition of an Evaluation Target Policy>>

There are various methods as a method of acquiring an evaluation target policy by using the acquisition unit 2020. The acquisition unit 2020, for example, accesses a storage apparatus (hereinafter, referred to as a policy storage apparatus) that stores control policies 20 for each control group 10 and acquires an evaluation target policy. In this case, the acquisition unit 2020 acquires identification information for determining an evaluation target policy and acquires, as an evaluation target policy, the control policy 20 determined by the identification information from the policy storage apparatus. It is assumed that, for example, the policy storage apparatus stores, in association with identification information of the control group 10, the control policy 20 used in the control group 10. In this case, the acquisition unit 2020 acquires identification information of the control group 10 to be evaluated and acquires, as an evaluation target policy, the control policy 20 associated with the identification information.

Herein, as in the above-described usage pattern 1, it is assumed that the policy evaluation apparatus 2000 is achieved by each group server 40. In this case, the group server 40 previously recognizes identification information of an evaluation target group. In other words, identification information of an evaluation target group is previously stored in a storage apparatus accessible from the group server 40. Therefore, the acquisition unit 2020 accesses the storage apparatus, and thereby acquires identification information of an evaluation target group.

On the other hand, as in the above-described usage pattern 2, when the policy evaluation apparatus 2000 can set a plurality of control groups 10 as an evaluation target, the acquisition unit 2020 receives, for example, input for specifying an evaluation target group. The acquisition unit 2020 receives, for example, a request including identification information of an evaluation target group. In this case, the acquisition unit 2020 extracts and uses, from the request, identification information of an evaluation target group. In addition, the acquisition unit 2020, for example, may receive user input (keyboard input or the like) for specifying an evaluation target group, and thereby acquire identification information of an evaluation target group.

The acquisition unit 2020 may receive an evaluation target policy itself from an outside. The acquisition unit 2020 receives, for example, a request including an evaluation target policy. In this case, the acquisition unit 2020 extracts an evaluation policy from the request, and thereby acquires an evaluation target policy.

Note that, acquisition of the control policy 20 may be executed under initiative of the policy evaluation apparatus 2000. The acquisition unit 2020, for example, acquires each control policy 20 from a policy storage apparatus at a periodical timing and evaluates each control policy 20. In addition, the acquisition unit 2020 may transmit, for example, to each group server 40 at a periodical timing, a request for requesting transmission of the control policy 20. In this case, the acquisition unit 2020 extracts the control policy 20 from a response to the request.

<<Acquisition of the Control Policy 20 to be a Comparison Target>>

The acquisition unit 2020 further acquires a plurality of control policies 20 used as a comparison target with respect to the evaluation target policy. Herein, the acquisition unit 2020 may acquire the control policy 20 for each of all control groups 10, or may acquire the control policy 20 for only some of control groups 10.

In the latter case, there are various method as a method of determining for which control group 10 the control policy 20 is acquired. The acquisition unit 2020, for example, selects a predetermined number of control groups 10 at random and acquires the control policy 20 for each of the selected control groups 10.

In addition, the acquisition unit 2020 acquires, for example, the control policy 20 for a plurality of control groups 10 fixedly determined. For example, a control group 10 (a control group 10 belonging to an IT department of a company, a control group 10 belonging to a security-related company, and the like) in which high quality of the control policy 20 is guaranteed is previously determined as a control group 10 used as a comparison target.

In addition, the acquisition unit 2020 acquires, for example, the control policy 20 for a control group 10 having an attribute similar to an attribute of an evaluation target group. It is assumed that, for example, control groups 10 each are a group (e.g., an operation division) belonging to any of a plurality of companies. In this case, the acquisition unit 2020 acquires, for example, the control policy 20 for a control group 10 belonging to the same company as for an evaluation target group or a control group 10 group-related to a company to which an evaluation target group belongs.

Note that, when an attribute of the control group 10 is used in this manner, information representing an attribute of each control group 10 is previously prepared. In the above-described policy storage apparatus, for example, information of a combination of "identification information of a control group 10, an attribute of the control group 10, and the control policy 20 used in the control group 10" is stored.

Herein, what attribute such as "in the same company" and "in a group company" is used may be previously determined fixedly, or may be specified by a user (an IT administrator or the like). In the latter case, for example, in a request received by the acquisition unit 2020, an attribute to be used is included together with identification information of an evaluation target group or an evaluation target policy. In addition, the acquisition unit 2020 specifies, for example, an attribute to be used.

A method of determining the control policy 20 to be acquired is not limited to a method of using an attribute of the control group 10. The acquisition unit 2020 acquires, for example, only the control policy 20 including the number of entries equal to or more than a predetermined threshold. In addition, the acquisition unit 2020 acquires, for example, the control policy 20 in which a degree of overlap with an evaluation target policy is equal to or more than a predetermined threshold. Herein, a threshold for the number of entries and a degree of overlap may be previously determined or may be specified by a user.

Note that, a degree of overlap between an evaluation target policy and another control policy 20 can be computed by the following equation (1) or the like.

[Math. 1]

$$v = \frac{|S|}{|E|} \quad (1)$$

A set E is a set of all entries included on an evaluation target policy. A set S is a set of entries (entries in which association between a control condition and execution permission/non-permission is matched) overlapping between an evaluation target policy and another control policy 20. |•| represents the number of elements of a set.

<Evaluation of an Evaluation Target Policy: S104>

The evaluation unit 2040 evaluates an evaluation target policy (S104). Herein, as a criterion for evaluation executed by the evaluation unit 2040, various criteria are employable.

The acquisition unit 2020 generates, for example, statistical information from a plurality of acquired control policies 20. Herein, in the control policy 20 used for generating statistical information, an evaluation target policy may be included or may not necessarily be included.

Statistical information indicates, for example, with respect to each control condition, a ratio between permission and non-permission associated with the control condition or a ratio between presence and absence of an entry indicating the control condition (a ratio between presence and absence of setting). As an example, it is assumed that the acquisition unit 2020 acquires fifty control policies 20. Among these, it is assumed that there are forty control policies 20 having an entry of a control condition being "application name: xyz". Further, among the forty control policies 20, it is assumed that there are thirty control policies 20 indicating permission and ten control policies 20 indicating non-permission. In this case, statistical information indicates, with respect to an application being xyz, 4 to 1 as a ratio of presence to absence and 3 to 1 as a ratio of permission to non-permission.

The evaluation unit 2040 compares each entry of an evaluation target policy with statistical information, and thereby evaluates the evaluation target policy. The evaluation unit 2040 determines, for example, among control conditions, a control condition in which a deviation with respect to setting of a policy is large between an evaluation target policy and statistical information. Hereinafter, a control condition in which a deviation with respect to setting of a policy is large between an evaluation target policy and statistical information is referred to as a deviated control condition. A matter that a control condition in which a deviation with respect to setting of a policy is large between an evaluation target policy and statistical information is determined in this manner produces the following advantages: 1) overlooking in determination by a policy setter can be found, 2) a policy likely to become unnecessary from now can be found, 3) a policy for which confirmation work such as a countermeasure and an examination is required can be found, and the like. Hereinafter, a method of determining a deviated control condition is described, together with an advantage of the method.

The evaluation unit 2040 compares, with respect to each control condition indicated by an evaluation target policy, for example, execution permission/non-permission indicated by the evaluation target policy for the control condition with execution permission/non-permission indicated by statistical information for the control condition. The evaluation unit 2040 determines, as a deviated control condition, for example, a control condition being not matched with either one, having a larger ratio, of execution permission/non-permission indicated by an evaluation target policy and execution permission/non-permission indicated by statistical information. In other words, each of 1) a control condition in which execution permission is indicated in an evaluation target policy and it is indicated that, in statistical information, a ratio of execution non-permission is larger than a ratio of execution permission and 2) a control condition in which execution non-permission is indicated in an evaluation target policy and it is indicated that, in statistical information, a ratio of execution permission is larger than a ratio of execution non-permission is determined as a deviated control condition. This matter can be described also in such a way that a control condition conflicting with a majority in setting of execution permission/non-permission is determined as a deviated control condition.

It is assumed that, for example, an evaluation target policy indicates "execution permission" for an application xyz and, in statistical information, a ratio of execution permission/non-permission for the application xyz is "execution permission:execution non-permission=1:4". In this case, "execution permission" indicated by the evaluation target policy is not matched with "execution non-permission" being a majority in the statistical information. Therefore, the application xyz is determined by the evaluation unit 2040 as a deviated control condition.

With regard to a control condition different from a majority in setting of execution permission/non-permission in this manner, it is possible to be overlooking in determination of execution permission/non-permission by a policy setter. Therefore, such a deviated control condition is determined, and thereby overlooking in determination by a policy setter can be found.

In addition, the evaluation unit 2040 determines, as a deviated control condition, for example, among control conditions indicated in an evaluation target policy, a control condition in which, in statistical information, a ratio of no setting is large (a control condition equal to or more than a predetermined threshold). In other words, a control condition, in which in many control policies 20, setting of execution permission/non-permission is not executed (there is no entry), but on the other hand, in an evaluation target policy, setting of execution permission/non-permission is executed (there is an entry), is determined as a deviated control condition.

It is assumed that, for example, an evaluation target policy indicates "execution permission" for an application xyz and, in statistical information, a ratio of presence/absence of setting for the application xyz is "presence:absence=1:4". Further, it is assumed that, as a predetermined threshold for a ratio of setting presence/absence, 70% is set. In this case, with regard to a control condition being "application name: application xyz", while, in an evaluation target policy, execution permission/non-permission is set, in a predetermined ratio or more of control policies 20, execution permission/non-permission is not set. Therefore, the application xyz is determined as a deviated control condition.

In this manner, with regard to a control condition in which, in an evaluation target policy, setting of execution permission/non-permission is executed, when setting of execution permission/non-permission is not executed in many other control policies 20, it is possible to be unnecessary to set execution permission/non-permission for such a control condition. Therefore, such a control condition is determined as a deviated control condition, and thereby a policy likely to become unnecessary from now can be found.

On the other hand, with regard to a control condition in which, in an evaluation target policy, setting of execution permission/non-permission is not executed, when setting of execution permission/non-permission is executed in many other control policies 20, it is possible to lack a required policy in the evaluation target policy. Therefore, such a control condition is determined as a deviated control condition, and thereby overlooking in determination by a policy setter can be found.

Further, with regard to a control condition indicated in an evaluation target policy, determination of execution permission/non-permission may vary in another control policy 20. In other words, a difference in ratio between permission and non-permission may be small (equal to or less than a predetermined threshold). With regard to such a control condition, confirmation work such as a countermeasure and an examination is performed, and thereby correct policy setting is preferably found. Therefore, such a control condition is determined as a deviated control condition, and thereby a policy requiring confirmation work can be found.

Herein, information indicated by statistical information is not limited to a ratio of execution permission/no-permission or a ratio of presence/absence of setting. Statistical information may indicate, for example, a change of setting in a past predetermined period. Specifically, a change of a ratio of execution permission/non-permission, a change of a ratio of presence/absence of setting, an increase rate or a decrease rate of a ratio of execution permission, an increase rate or a decrease rate of a ratio of execution non-permission, an increase rate or a decrease rate of setting presence, an increase rate or a decrease rate of setting absence, and the like in a past predetermined period may be included in statistical information. Note that, when attention is paid to a temporal change in this manner, with respect to each control group 10, a history of a modification of the control policy 20 is stored in a policy storage apparatus, and a change of setting is computed by using the history.

The evaluation unit 2040 determines, as a deviated control condition, for example, among control conditions being not indicated in an evaluation target policy, a control condition in which a ratio of the control policies 20 with an entry with respect to the control condition added in a past predetermined period is equal to or more than a predetermined threshold. Note that, the ratio referred to herein is a rate to a total number of control policies 20 acquired by the acquisition unit 2020. With regard to a control condition in which a policy starts being set by other control policies 20 in this manner, it can be said that it is highly necessary to confirm whether to be a target for execution control also in an evaluation target group. Therefore, such a control condition is determined as a deviated control condition, and thereby a policy requiring confirmation work can be found.

In addition, the evaluation unit 2040 determines, as a deviated control condition, for example, among control conditions indicated in an evaluation target policy, a control condition in which a ratio of the control policy 20 having been subjected to deletion of an entry with respect to the control condition in a past predetermined period is equal to or more than a predetermined threshold. With regard to a control condition in which a policy starts being deleted by other control policies 20 in this manner, it can be said that it is highly necessary to confirm whether to be excluded from a target for execution control also in an evaluation target group. Therefore, such a control condition is determined as a deviated control condition, and thereby a policy requiring confirmation work can be found.

<<Consideration of the Number of Times of Execution of Control>>

The evaluation unit 2040 may further include, in the above-described statistical information, the number of times of actual execution of control using the control policy 20 (i.e., the number of times of trials of execution of an application in the terminal 12) and a temporal change of the number of times (a history of the number of times with respect to each past predetermined period). The number of times of execution of control using the control policy 20 can be recognized by storing, by an apparatus (e.g., a group server 40) having executed the control, a control history. Hereinafter, the number of times of actual execution of control using the control policy 20 for a certain control condition is referred to as a number of control times.

Herein, in a case where a number of control times is considered, as an assumption of the case, it is assumed that an application which does not apply to any of control conditions indicated in the control policy 20 is specified for control by an administrator. Specifically, when such an application is activated by the terminal 12, in the terminal 12, the activation is temporarily interrupted. Then, an administrator manually specifies execution permission/non-permission of the application by using the group server 40. Note that, at that time, execution permission/non-permission of an application manually specified may be automatically added to the control policy 20, or such addition may not necessarily be made.

Under such an assumption, the evaluation unit 2040 sets, as a deviated control condition, for example, among control conditions indicated in an evaluation target policy, a control condition in which a number of control times indicated by statistical information is equal to or less than a predetermined threshold. The reason is that in this case, it is conceivable that the number of times of execution of an application satisfying a control condition is small, and therefore without previously setting execution permission/non-permission of the application in the control policy 20, the above-described manual control based on an administrator may be executed every time.

In addition, the evaluation unit 2040 handles, as a deviated control condition, for example, among deviated control conditions determined based on the above-described methods, only a control condition in which a number of control times is equal to or more than a predetermined threshold. By doing so, among control conditions to which attention is to be paid based on various reasons as described above, a control condition particularly useful for automating, due to a large number of control times, execution control using the control policy 20 can be targeted and handled as a deviated control condition. Further, a matter that, with respect to a certain control condition, a number of control times indicated by statistical information is large means that, for control of an application relevant to the control condition, the control policy 20 is actually used many times. In other words, it means that, for the control condition, reliability of control indicated by the control policy 20 is relatively high. Therefore, a number of control times is further considered in determination of a deviated control condition, and thereby a control condition to which attention is to be paid can be determined with higher accuracy.

<Generation of Evaluation Information 30: S106>

The evaluation unit 2040 generates, based on a determined deviated control condition, evaluation information 30 (S106). The evaluation unit 2040 generates, for example, evaluation information 30 indicating each control condition. Further, evaluation information 30 further includes information representing a reason why each deviated control condition is determined as a deviated control condition.

FIG. 8 is a diagram illustrating evaluation information 30. FIG. 8 illustrates a case where the evaluation information 30 is achieved as an evaluation screen 50. The evaluation screen 50 includes a table 52 including each control condition determined as a deviated control condition and a reason why the control condition is determined as a deviated control condition. Further, in each row of the table 52, a detail button 54 is provided. When a user presses the detail button 54, a detail screen 60 indicating detailed information for the relevant control condition is output.

Figure 9:
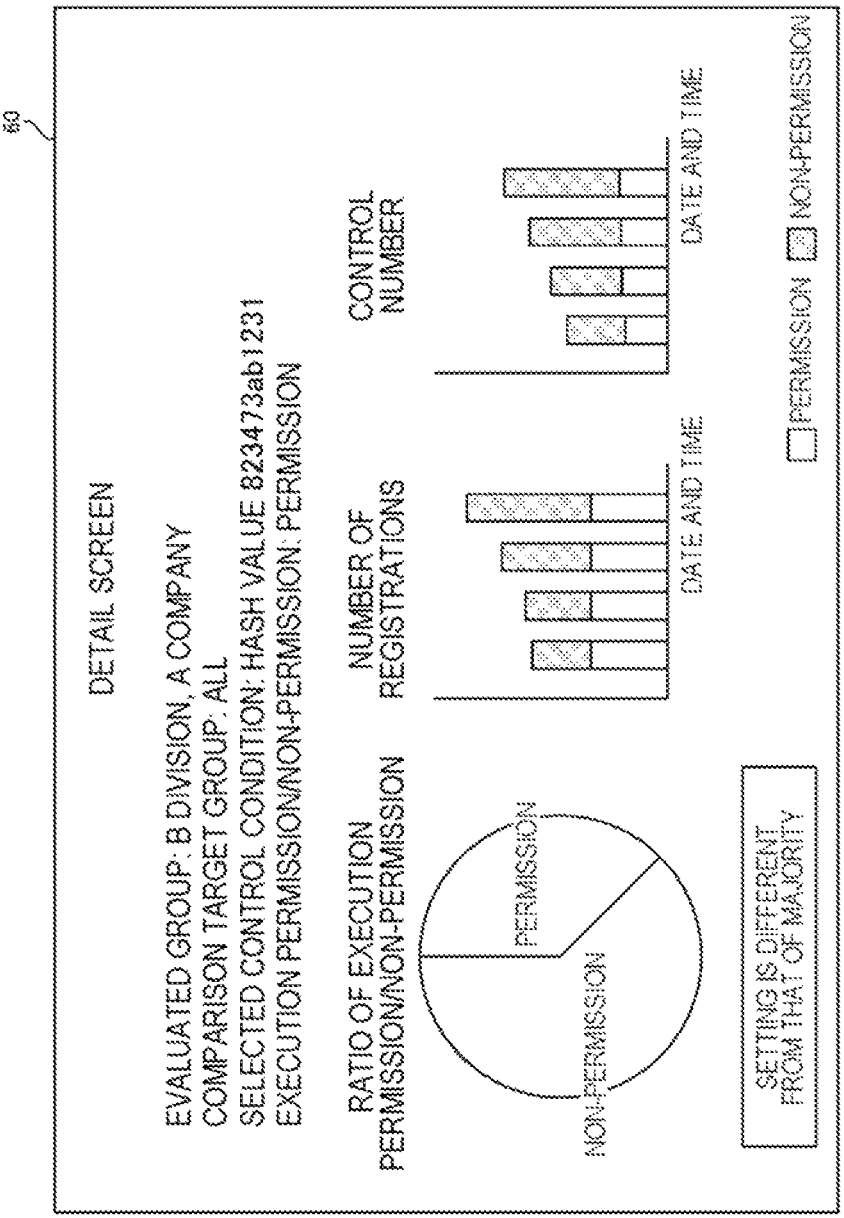
FIG. 9 is a diagram illustrating a detail screen.

FIG. 9 is a diagram illustrating a detail screen. The detail screen 60 indicates statistical information for a selected control condition. Further, in addition to the statistical information, a message representing a reason why determination as a deviated control condition is executed.

Herein, evaluation information 30 does not always need to be achieved as a screen. The evaluation information 30 can be achieved, for example, as a file, as in the above-described table 52, including a control condition determined as a deviated control condition and information indicating a reason for the determination. Note that, any file format is employable for the file.

<<Another Example of Evaluation Information 30>>

When introduction-related information is handled as a control condition, evaluation information 30 described below may be generated. The evaluation unit 2040 extracts, from an evaluation target policy, an entry indicating introduction-related information as a control condition. Further, the evaluation unit 2040 extracts, from among control policies 20 of comparison targets, an entry indicating introduction-related information as a control condition and being the same setting of execution permission/non-permission as the entry extracted from the evaluation target policy. When, for example, the entry extracted from an evaluation target policy indicates "execution non-permission", the entry is an entry indicating "an introduction condition for causing execution not to be permitted". Therefore, also from another control policy 20, similarly, an entry indicating "an introduction condition for causing execution not to be permitted" is extracted.

The evaluation unit 2040 acquires, with respect to an entry extracted from each control policy 20, among applications controlled by an execution control apparatus by using the control policy 20, a ratio (hereinafter, a determination matching rate) of applications determined as satisfying a control condition indicated by the entry. Therefore, each execution control apparatus stores, with respect to determination, executed for an application being activated, of whether the application satisfies a control condition of each entry, information representing the determination result. Based on information stored in this manner, with respect to each entry indicating introduction-related information as a control condition, a ratio with which an application being activated satisfies a control condition can be determined.

Figure 10:
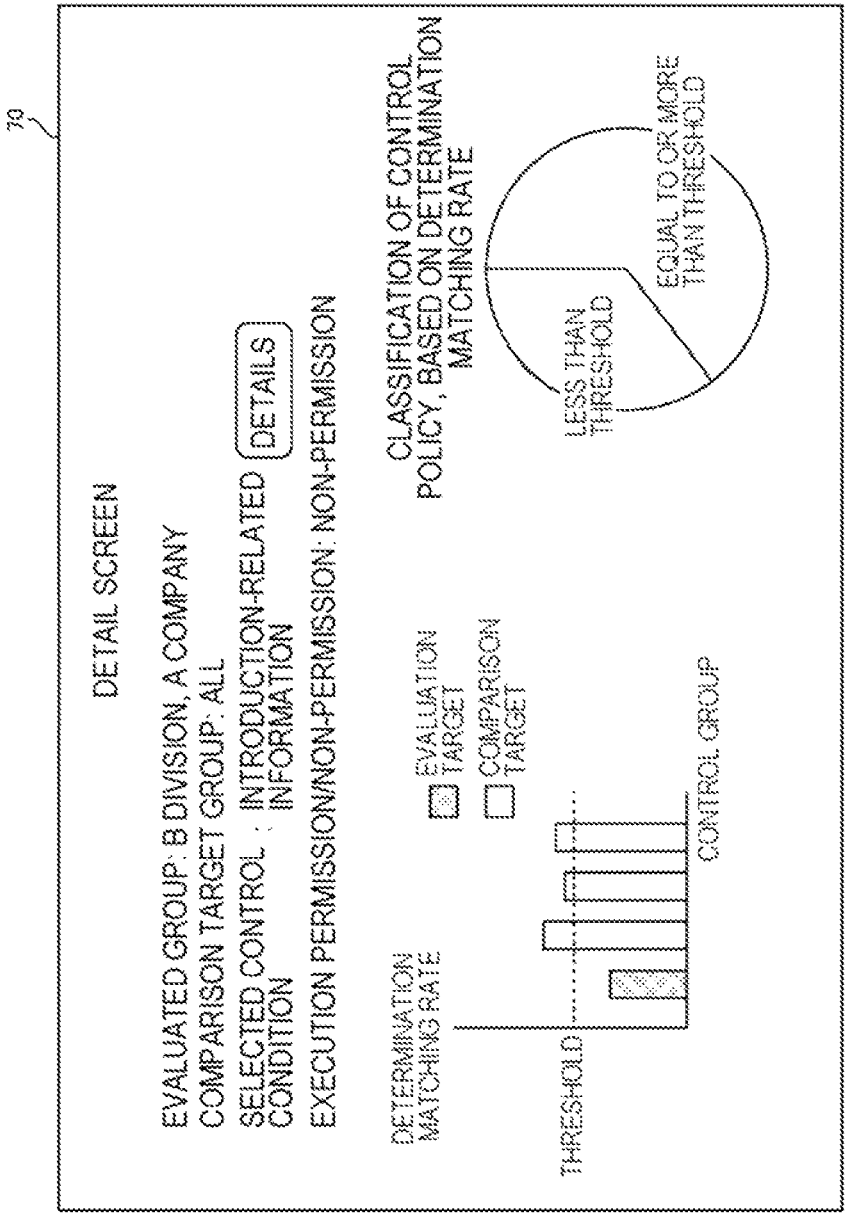
FIG. 10 is a diagram illustrating evaluation information 30 including a determination matching rate.

The evaluation unit 2040 generates, as evaluation information 30, information relating to a determination matching rate computed for each control policy 20. FIG. 10 is a diagram illustrating evaluation information 30 including a determination matching rate. A detail screen 70 in FIG. 10 is an example of a detail screen displayed, when a record indicating introduction-related information as a control condition is included in the table 52 in FIG. 8, by pressing the detail button 54 of the record.

In the detail screen 70, in the control policy 20 of an evaluation target, a determination matching rate is less than a threshold. On the other hand, in the control policies 20 of other control groups 10, a determination matching rate is equal to or more than the threshold. Therefore, it is understood that, in the control policy 20 of an evaluation target, a determination matching rate is low, compared with other control policies 20. Therefore, it is understood that preferably, referring to control policies 20 of other control groups 10, introduction-related information used for control is modified.

Note that, in the detail screen 70, details of introduction-related information being a control condition are not displayed, and by pressing a detail button, information such as a graph representing an introduction route is displayed. However, when there is sufficient space in the detail screen 70, details of introduction-related information may be included in the detail screen 70.

<Output of Evaluation Information 30: S108>

The evaluation unit 2040 outputs generated evaluation information 30 (S108). Any output destination of evaluation information 30 is employable. The evaluation unit 2040, for example, displays evaluation information 30 in a display apparatus accessible from the policy evaluation apparatus 2000, or stores evaluation information 30 in a storage apparatus accessible from the policy evaluation apparatus 2000. In addition, the evaluation unit 2040, for example, may transmit evaluation information 30 to another apparatus accessible from the policy evaluation apparatus 2000. It is assumed that, for example, the policy evaluation apparatus 2000 evaluates, in response to a request from another apparatus, an evaluation target policy (a case of the usage pattern 2). In this case, the evaluation unit 2040 transmits evaluation information 30 to the apparatus having transmitted the request.

While an example embodiment of the present invention has been described with reference to the drawings, the example embodiment is only exemplification of the present invention, and various configurations other than the above-described configuration can also be employed.

The whole or part of the example embodiment disclosed above can be described as, but not limited to, the following supplementary notes.

1. A policy evaluation apparatus including:
   an acquisition unit that acquires, with respect to each of a plurality of control groups including an evaluation target group, control policies each indicating execution permission/non-permission of an application to be executed on a terminal included in the control group; and
   an evaluation unit that compares an evaluation target policy being the control policy of the evaluation target group with other plurality of control policies and generates evaluation information based on a result of the comparison.

2. The policy evaluation apparatus according to supplementary note 1, wherein
   the control policy indicates a control condition being a condition for determining an application to be controlled and execution permission/non-permission of an application determined by the control condition in association with each other, and
   the evaluation unit
     includes, in the evaluation information, information relating to a control condition, the control condition being associated with execution permission in the evaluation target policy, and the control condition being such that more control policies indicate execution non-permission for the control condition than execution permission, or
     includes, in the evaluation information, information relating to a control condition, the control condition being associated with execution non-permission in the evaluation target policy, and the control condition being such that more control policies indicate execution permission for the control condition than execution non-permission.

3. The policy evaluation apparatus according to supplementary note 1, wherein
   the control policy indicates a control condition being a condition for determining an application to be controlled and execution permission/non-permission of an application determined by the control condition in association with each other, and
   the evaluation unit includes, in the evaluation information, among control conditions indicated by the evaluation target policy, information relating to a control condition in which a ratio of the control policies not including an entry indicating the control condition indicated by the evaluation target policy is equal to or more than a predetermined threshold.

4. The policy evaluation apparatus according to supplementary note 1, wherein
   the control policy indicates a control condition being a condition for determining an application to be controlled and execution permission/non-permission of an application determined by the control condition in association with each other, and
   the evaluation unit includes, in the evaluation information, information relating to, among control conditions indicated by the evaluation target policy, a control condition in which a difference between a ratio of the control policies indicating execution permission for the control condition and a ratio of the control policies indicating execution non-permission is equal to or less than a predetermined threshold.

5. The policy evaluation apparatus according to supplementary note 1, wherein
   the control policy indicates a control condition being a condition for determining an application to be controlled and execution permission/non-permission of an application determined by the control condition in association with each other, and
   the evaluation unit includes, in the evaluation information, information relating to, among control conditions being not indicated in the evaluation target policy, a control condition in which a ratio of control policies added with an entry indicating the control condition in a past predetermined period is equal to or more than a predetermined threshold.
6. The policy evaluation apparatus according to any one of supplementary notes 1 to 5, wherein
the control policy indicates a control condition being a condition for determining an application to be controlled and execution permission/non-permission of an application determined by the control condition in association with each other, and
the evaluation unit
generates, with respect to the plurality of acquired control policies, for each control condition, statistical information indicating a ratio between control policies in each of which execution permission is associated with the control condition and control policies in each of which execution non-permission is associated with the control condition or a ratio between control policies in each of which an entry indicating the control condition is present and control policies in each of which the entry is absent,
determines, as a deviated control condition, the control condition having a large degree of deviation between the evaluation target policy and the statistical information, and
includes, in the evaluation information, information relating to the deviated control condition.
7. The policy evaluation apparatus according to any one of supplementary notes 2 to 6, wherein
the control condition indicates any one of discrimination information of an application, an attribute of an application, and introduction-related information relating to introduction of an application.
8. The policy evaluation apparatus according to supplementary note 7, wherein
the introduction-related information indicates any one of information relating to an introduction route of an application, information relating to a location where an application is deployed, and information relating to setting associated with introduction of an application.
9. The policy evaluation apparatus according to any one of supplementary notes 1 to 8, wherein
the acquisition unit acquires the control policy for each control group having an attribute similar to an attribute of the evaluation target group.
10. The policy evaluation apparatus according to any one of supplementary notes 1 to 8, wherein
the acquisition unit acquires each control policy in which a degree of overlap with the evaluation target policy is equal to or more than a predetermined threshold.
11. A control method executed by a computer, including:
an acquisition step of acquiring, with respect to each of a plurality of control groups including an evaluation target group, control policies each indicating execution permission/non-permission of an application to be executed on a terminal included in the control group; and
an evaluation step of comparing an evaluation target policy being the control policy of the evaluation target group with other plurality of control policies and generating evaluation information based on a result of the comparison.
12. The control method according to supplementary note 11, wherein
the control policy indicates a control condition being a condition for determining an application to be controlled and execution permission/non-permission of an application determined by the control condition in association with each other, and
in the evaluation step,
including, in the evaluation information, information relating to a control condition, the control condition being associated with execution permission in the evaluation target policy, and the control condition being such that more control policies indicate execution non-permission for the control condition than execution permission, or
including, in the evaluation information, information relating to a control condition, the control condition being associated with execution non-permission in the evaluation target policy, and the control condition being such that more control policies indicate execution permission for the control condition than execution non-permission.
13. The control method according to supplementary note 11, wherein
the control policy indicates a control condition being a condition for determining an application to be controlled and execution permission/non-permission of an application determined by the control condition in association with each other, and
in the evaluation step, including, in the evaluation information, among control conditions indicated by the evaluation target policy, information relating to a control condition in which a ratio of the control policies not including an entry indicating the control condition indicated by the evaluation target policy is equal to or more than a predetermined threshold.
14. The control method according to supplementary note 11, wherein
the control policy indicates a control condition being a condition for determining an application to be controlled and execution permission/non-permission of an application determined by the control condition in association with each other, and
in the evaluation step, including, in the evaluation information, information relating to, among control conditions indicated by the evaluation target policy, a control condition in which a difference between a ratio of the control policies indicating execution permission for the control condition and a ratio of the control policies indicating execution non-permission is equal to or less than a predetermined threshold.
15. The control method according to supplementary note 11, wherein
the control policy indicates a control condition being a condition for determining an application to be controlled and execution permission/non-permission of an application determined by the control condition in association with each other, and
in the evaluation step, including, in the evaluation information, information relating to, among control conditions being not indicated in the evaluation target policy, a control condition in which a ratio of control policies added with an entry indicating the control condition in a past predetermined period is equal to or more than a predetermined threshold.
16. The control method according to any one of supplementary notes 11 to 15, wherein
the control policy indicates a control condition being a condition for determining an application to be controlled and execution permission/non-permission of an application determined by the control condition in association with each other, and in the evaluation step, generating, with respect to the plurality of acquired control policies, for each control condition, statistical information indicating a ratio between control policies in each of which execution permission is associated with the control condition and a control policies in each of which execution non-permission is associated with the control condition or a ratio between a control policies in each of which an entry indicating the control condition is present and control policies in each of which the entry is absent;

determining, as a deviated control condition, the control condition having a large degree of deviation between the evaluation target policy and the statistical information; and including, in the evaluation information, information relating to the deviated control condition.

17. The control method according to any one of supplementary notes 12 to 16, wherein
the control condition indicates any one of discrimination information of an application, an attribute of an application, and introduction-related information relating to introduction of an application.

18. The control method according to supplementary note 17, wherein
the introduction-related information indicates any one of information relating to an introduction route of an application, information relating to a location where an application is deployed, and information relating to setting associated with introduction of an application.

19. The control method according to any one of supplementary notes 11 to 18, wherein
in the acquisition step, acquiring the control policy for each control group having an attribute similar to an attribute of the evaluation target group.

20. The control method according to any one of supplementary notes 11 to 18, wherein
in the acquisition step, acquiring each control policy in which a degree of overlap with the evaluation target policy is equal to or more than a predetermined threshold.

21. A program causing a computer to execute each step of the control method according to any one of supplementary notes 11 to 20.

What is claimed is:

1. A policy evaluation apparatus comprising:
at least one memory configured to store instructions; and
at least one processor configured to execute the instructions to:
acquire a plurality of control policies for a respective plurality of control groups including an evaluation target group, each control policy indicating execution permission/non-permission of an application on a terminal included in a corresponding control group;
compare an evaluation unit that compares an evaluation target policy, which is the control policy for the evaluation target group, with a plurality of other control policies for a plurality of other control groups different than the evaluation target group; and
generate evaluation information based on a result of the comparison, the evaluation information indicating an entry of the evaluation target policy deviating more than a threshold from statistics of the plurality of other control policies.

2. The policy evaluation apparatus according to claim 1, wherein
each control policy indicates a control condition for determining the application and the execution permission/non-permission of the application which satisfies the control condition in association with each other, and
the at least one processor is further configured to execute the instructions to:
include, in the evaluation information, information relating to a control condition associated with execution permission in the evaluation target policy, wherein the control condition is such that more of the plurality of other control policies indicate execution non-permission for the control condition than the execution permission, or
include, in the evaluation information, information relating to a control condition associated with execution non-permission in the evaluation target policy, wherein the control condition is such that more of the plurality of other control policies indicate the execution permission for the control condition than the execution non-permission.

3. The policy evaluation apparatus according to claim 1, wherein
each control policy indicates a control condition for determining the application and the execution permission/non-permission of the application which satisfies the control condition in association with each other, and
the at least one processor is further configured to execute the instructions to include, in the evaluation information, among control conditions indicated by the evaluation target policy, information relating to a control condition in which a ratio of a number of the plurality of other control policies not including an entry indicating the control condition indicated for the evaluation target policy to a total number of the plurality of other control policies is equal to or more than a predetermined threshold.

4. The policy evaluation apparatus according to claim 1, wherein
each control policy indicates a control condition for determining the application and the execution permission/non-permission of the application which satisfies the control condition in association with each other, and
the at least one processor is further configured to execute the instructions to include, in the evaluation information, information relating to, among control conditions indicated by the evaluation target policy, a control condition in which a difference between a ratio of a number of the plurality of control policies indicating execution permission for the control condition to a total number of the plurality of other control policies and a ratio of a number of the plurality of control policies indicating execution non-permission to a total number of the plurality of other control policies is equal to or less than a predetermined threshold.

5. The policy evaluation apparatus according to claim 1, wherein
each control policy indicates a control condition for determining the application and the execution permission/non-permission of the application which satisfies the control condition in association with each other, and
the at least one processor is further configured to execute the instructions to include, in the evaluation information, information relating to, among control conditions not indicated by the evaluation target policy, a control condition in which a ratio of a number of the plurality of other control policies in which entries indicating the control condition have been added in a past predetermined period to a total number of the plurality of other control policies is equal to or more than a predetermined threshold.

6. The policy evaluation apparatus according to claim 1, wherein
each control policy indicates a control condition for determining the application and the execution permission/non-permission of the application which satisfies the control condition in association with each other, and
the at least one processor is further configured to execute the instructions to:
generate, with respect to the acquired plurality of control policies, for each control condition, statistical information indicating a ratio between a number of the plurality of control policies in which execution permission is associated with the control condition and a number of the plurality of control policies in which execution non-permission is associated with the control condition, or a ratio between a number of the plurality of control policies in which an entry indicating the control condition is present and a number of the plurality of control policies in which the entry is absent;
determine, as a deviated control condition, the control condition indicated by the evaluation target policy in which the ratio indicated in the statistical information shows a majority; and
include, in the evaluation information, information relating to the deviated control condition.

7. The policy evaluation apparatus according to claim 2, wherein
the control condition indicates any one of identification information of the application, an attribute of the application, and introduction-related information relating to introduction of the application.

8. The policy evaluation apparatus according to claim 7, wherein
the introduction-related information indicates any one of information relating to an introduction route of the application, information relating to a location where the application is deployed, and information relating to setting associated with introduction of the application.

9. The policy evaluation apparatus according to claim 1, wherein
the at least one processor is further configured to execute the instructions to acquire the control policy for each control group having an attribute similar to an attribute of the evaluation target group.

10. The policy evaluation apparatus according to claim 1, wherein
the at least one processor is further configured to execute the instructions to acquire each control policy in which a degree of overlap with the evaluation target policy is equal to or more than a predetermined threshold.

11. A control method executed by a computer and comprising:
acquiring a plurality of control policies for a respective plurality of control groups including an evaluation target group, each control policy indicating execution permission/non-permission of an application on a terminal included in a corresponding control group; and comparing an evaluation target policy, which is the control policy for the evaluation target group, with a plurality of other control policies for a plurality of other control groups different than the evaluation target group; and
generating evaluation information based on a result of the comparison, the evaluation information indicating an entry of the evaluation target policy deviating more than a threshold from statistics of the plurality of other control policies.

12. The control method according to claim 11, wherein
each control policy indicates a control condition for determining the application and the execution permission/non-permission of the application which satisfies the control condition in association with each other, and
in the comparing,
including, in the evaluation information, information relating to a control condition associated with execution permission in the evaluation target policy, wherein the control condition is such that more of the plurality of other control policies indicate execution non-permission for the control condition than the execution permission, or
including, in the evaluation information, information relating to a control condition associated with execution non-permission in the evaluation target policy, wherein the control condition is such that more of the plurality of other control policies indicate the execution permission for the control condition than the execution non-permission.

13. The control method according to claim 11, wherein
each control policy indicates a control condition for determining the application and the execution permission/non-permission of the application which satisfies the control condition in association with each other, and
in the comparing, including, in the evaluation information, among control conditions indicated by the evaluation target policy, information relating to a control condition in which a ratio of a number of the plurality of other control policies not including an entry indicating the control condition indicated for the evaluation target policy to a total number of the plurality of other control policies is equal to or more than a predetermined threshold.

14. The control method according to claim 11, wherein
each control policy indicates a control condition for determining the application and the execution permission/non-permission of the application which satisfies the control condition in association with each other, and
in the comparing, including, in the evaluation information, information relating to, among control conditions indicated by the evaluation target policy, a control condition in which a difference between a ratio of a number of the plurality of control policies indicating execution permission for the control condition to a total number of the plurality of other control policies and a ratio of a number of the plurality of control policies indicating execution non-permission to a total number of the plurality of other control policies is equal to or less than a predetermined threshold.

15. The control method according to claim 11, wherein
each control policy indicates a control condition for determining the application and the execution permission/non-permission of the application which satisfies the control condition in association with each other, and
in the comparing, including, in the evaluation information, information relating to, among control conditions not indicated by the evaluation target policy, a control condition in which a ratio of a number of the plurality of other control policies in which entries indicating the control condition have been added in a past predetermined period to a total number of the plurality of other control policies is equal to or more than a predetermined threshold.

16. The control method according to claim 11, wherein each control policy indicates a control condition for
determining the application and the execution permission/non-permission of the application which satisfies the control condition in association with each other, and in the acquiring,
generating, with respect to the acquired plurality of control policies, for each control condition, statistical information indicating a ratio between a number of the plurality of control policies in which execution permission is associated with the control condition and a number of the plurality of control policies in which execution non-permission is associated with the control condition, or a ratio between a number of the plurality of control policies in which an entry indicating the control condition is present and a number of the plurality of control policies in which the entry is absent;

in the acquiring,
determining, as a deviated control condition, the control condition indicated by the evaluation target policy in which the ratio indicated in the statistical information shows a majority; and
including, in the evaluation information, information relating to the deviated control condition.

17. The control method according to claim 12, wherein the control condition indicates any one of identification information of the application, an attribute of the application, and introduction-related information relating to introduction of the application.

18. The control method according to claim 17, wherein the introduction-related information indicates any one of information relating to an introduction route of the application, information relating to a location where the application is deployed, and information relating to setting associated with introduction of the application.

19. The control method according to claim 11, wherein in the acquiring, acquiring the control policy for each control group having an attribute similar to an attribute of the evaluation target group.

20. The control method according to claim 11, wherein in the acquiring, acquiring each control policy in which a degree of overlap with the evaluation target policy is equal to or more than a predetermined threshold.

21. A non-transitory computer-readable storage medium storing a program causing the computer to execute the control method according to claim 11.

* * * * *